March 28, 1967     S. PALLIS ET AL     3,310,949
GROUP THRUST COMPENSATOR
Filed June 1, 1964     4 Sheets-Sheet 1

INVENTORS
STEPHEN PALLIS & JOHN RILETT
BY
ATTORNEY

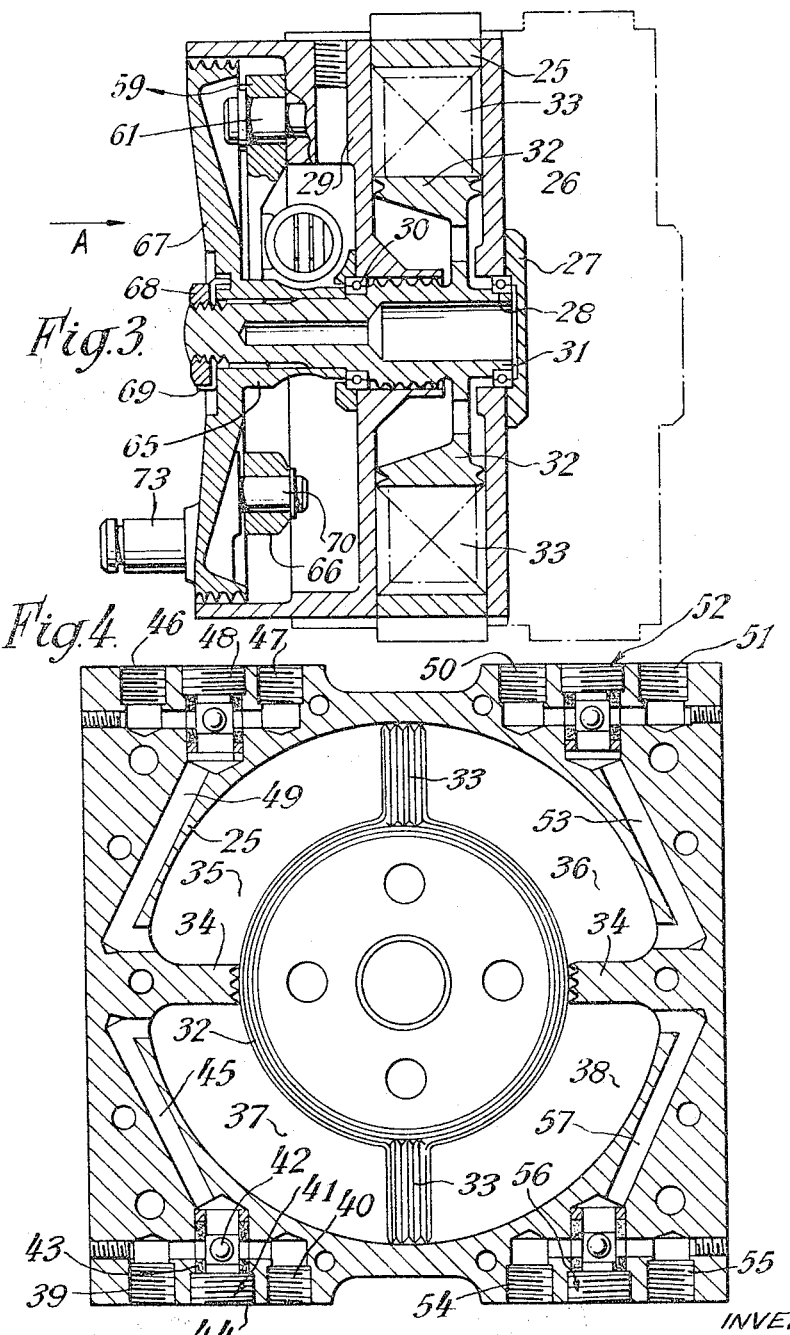

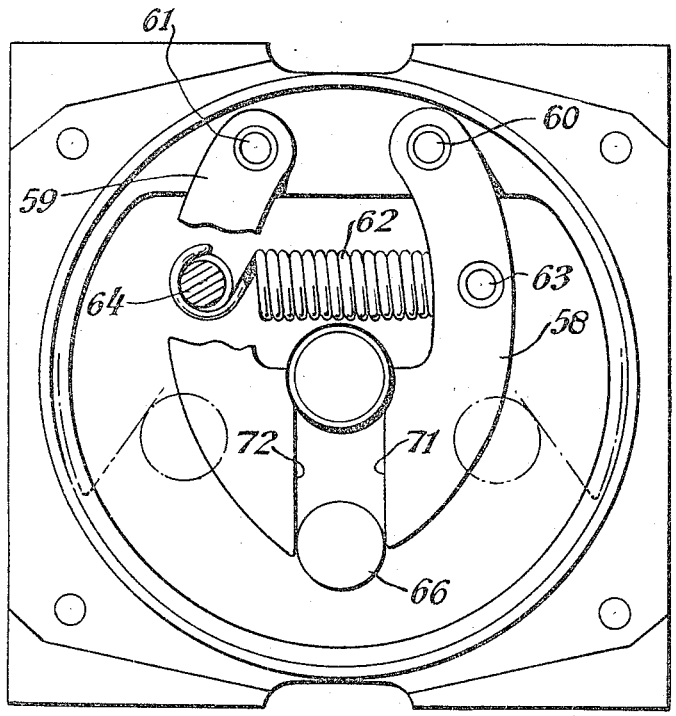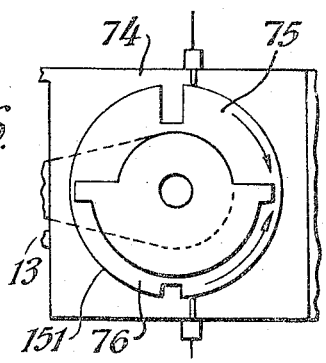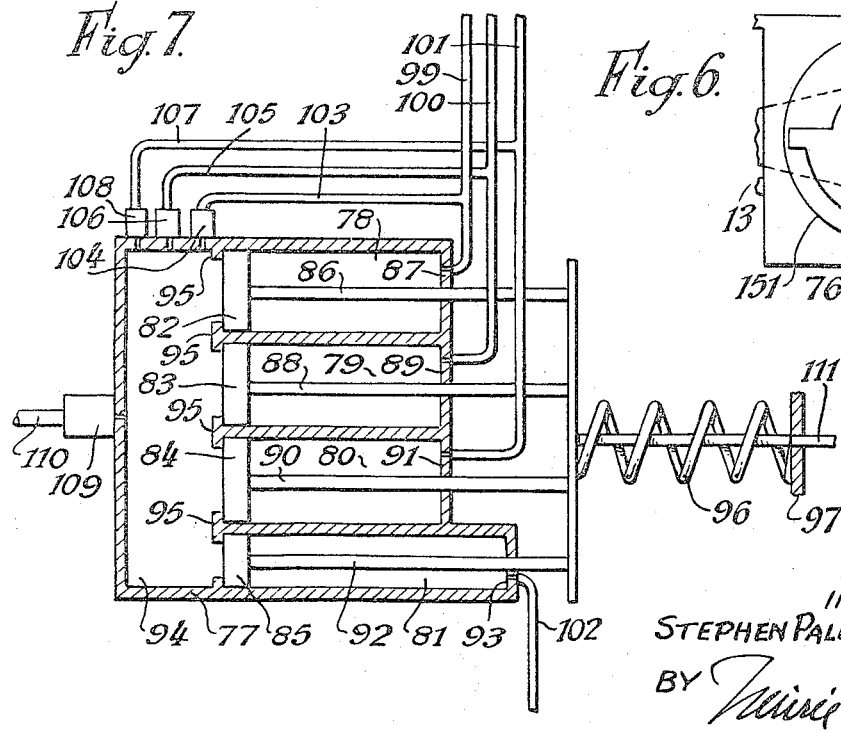

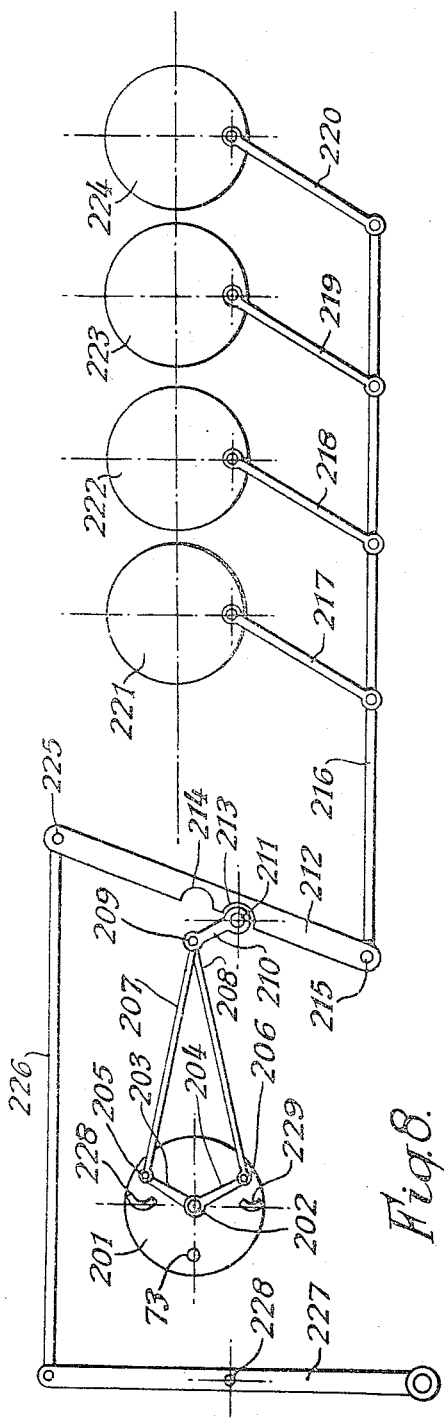
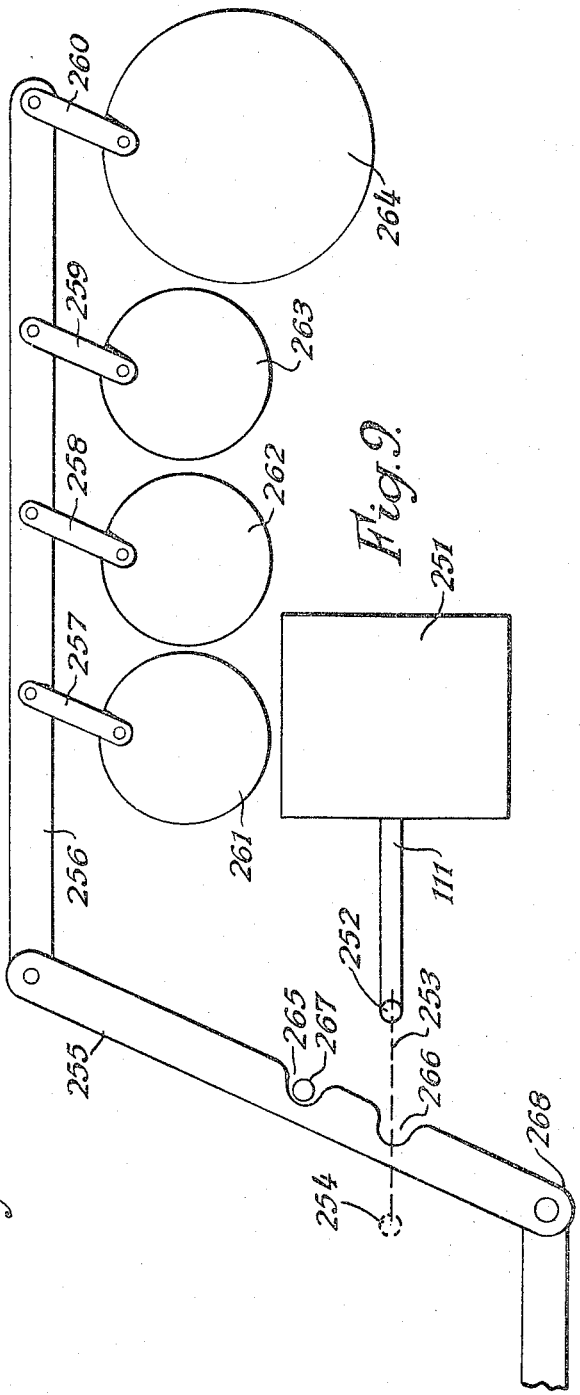

United States Patent Office 3,310,949
Patented Mar. 28, 1967

3,310,949
GROUP THRUST COMPENSATOR
Stephen Pallis, Bluebell Hill, near Rochester, and John Rilett, Ickleton, England, assignors to Elliott Brothers (London) Limited, Lewisham, London, England
Filed June 1, 1964, Ser. No. 371,694
Claims priority, application Great Britain, June 7, 1963, 22,687/63
10 Claims. (Cl. 60—243)

This invention relates to a group thrust compensator for an aircraft engine installation, that is to say, a device which functions automatically to maintain the thrust delivered by a group of engines despite variations in the thrust of individual engines of the group.

In VTOL or STOL aircraft employing a plurality of lift engines, possibly arranged in groups contained in wing pods, and possibly operating in conjunction with a further one or more engines delivering both a lift thrust and a forward thrust, it is of supreme importance that a balanced thrust is maintained since a sudden variation, either upwards or downwards, in the lift thrust may have disastrous effects before the human pilot or an automatic stabiliser is able to take corrective action.

It is an object of the present invention to provide improvements in such group thrust compensators.

A further object of the invention is to provide a group thrust compensator which affords means for magnifying the manual throttle displacement signal to an unaffected engine to compensate for failure of another engine.

Another object of the invention is to provide a group thrust compensator which affords means for closing the engine throttles independently of its own operation.

Yet another object is to provide means whereby the group thrust compensator does not operate in the event of an engine running away.

In order that the invention may be clearly understood certain embodiments thereof will now be described by way of example with reference to the accompanying drawings in which:

FIGURE 3 is a sectional elevation through one form of fluid pressure responsive device;

FIGURE 4 is a cross-sectional elevation of the device of FIGURE 3 taken at right angles to that of FIGURE 3 and looking in the direction of the arrow A;

FIGURE 5 is a front view of the device of FIGURES 3 and 4 also looking in the direction of the arrow A;

FIGURE 6 is a diagrammatic view of a modified form of fluid pressure responsive device;

FIGURE 7 shows another form of fluid pressure responsive device;

FIGURE 8 is a diagrammatic representation of a group thrust compensator including a fluid pressure responsive device as shown in FIGURES 3, 4 and 5 and as described in copending application Ser. No. 364,087, Ellis et al., and FIGURE 9 is a diagrammatic representation of a group thrust compensator including a fluid pressure responsive device of the form shown in FIGURE 7 and described in copending application Ser. No. 333,473, Bishop et al.

Figure 1:
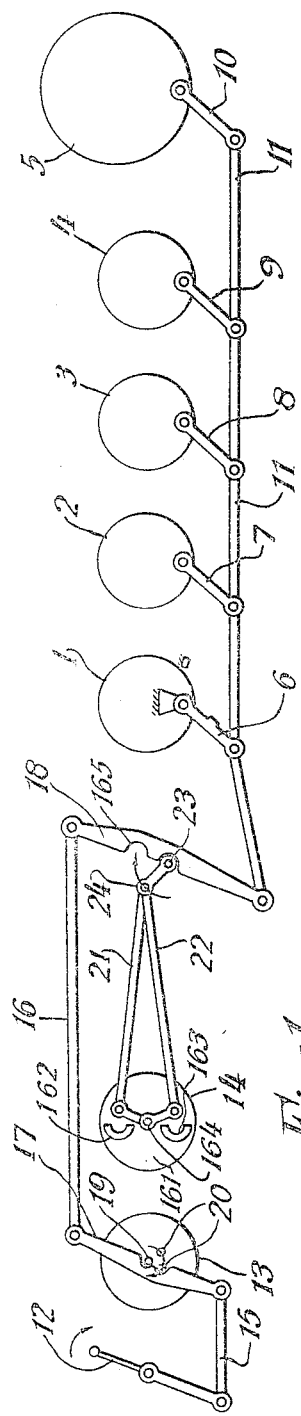
FIGURE 1 is a diagrammatic view of a group thrust compensator in accordance with the present invention showing the throttle control lever in the closed position.
Figure 2:
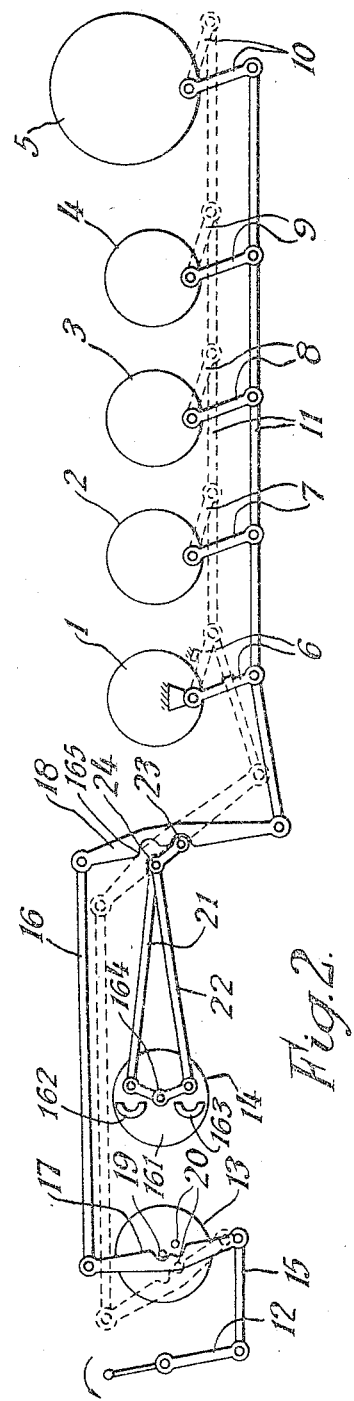
FIGURE 2 is a view of the group thrust compensator of FIGURE 1 showing the throttle control lever in a partially open position.

Referring first to FIGURES 1 and 2 a group thrust compensator is illustrated in relation to a group of engines in one wing of an aircraft, engines 1, 2, 3 and 4 being envisaged as incorporated in a wing pod and the larger engine 5 being an inboard engine on the same wing. The throttle control levers of the engines are shown at 6, 7, 8, 9 and 10 and are connected to a common linkage 11. The manual control lever 12 is shown in the closed position in FIGURE 1, partly open in solid lines in FIGURE 2. The mechanism is shown in dotted lines after operation of the group thrust compensator on failure of the inboard engine 5. Fluid pressure responsive devices in the form of rotary actuators of the type hereinafter described with reference to FIGURES 6 and 3, 4 and 5 are shown diagrammatically at 13 and 14, respectively, 13 being related to the inboard engine 5 and 14 being related to the engines 1, 2, 3 and 4. The manual lever 12 is connected by links 15 and 16 to rocking levers 17 and 18, the lever 18 carrying the link 11 associated with the throttle controls of the respective engines. The pivot 19 is coaxial with the normal pivot of the rotor shaft of a rotary actuator hereinafter described such as the shaft 31 in FIGURE 3 and the pivot 20 corresponds to the actuated pivot of the rotary actuator 74 hereinafter described with reference to FIGURE 6. As shown in FIGURES 1 and 2 indentations are provided in the lever 17 which accommodate the pivots 19 and 20. The rotary actuator 14 which is related to the engines 1, 2, 3 and 4 is connected by linkage 21, 22 to a fixed pivot 23 and a movable pivot 24 adapted to seat in the indentations provided in lever 18 which are shown in the drawings.

Plate 161 is rotatable by actuated pivot 73 (see FIGURE 3), of rotary actuator 14, about fixed pivot 164. Two members 162 and 163 are rigidly attached to plate 161 and are arranged to move pivot 24 by way of linkage 21 and 22 towards notch 165 irrespective of the direction of rotation of plate 161 from the position shown in FIGURES 1 and 2.

It will be seen from the drawings that operation of one of the rotary actuators 13, 14 as shown by the arrows results in either replacement of the manual pivot point 19 associated with operation of the manual control lever by the pivot point 20 or replacement of pivot point 23 by pivot point 24 both 20 and 24 of which are nearer than 19 and 23 respectively to the input and further from the output of the control thereby giving, to compensate for a failed engine, a magnification of manual displacement signals transmitted to the engines. It is further apparent that when the throttle lever 12 is in the closed position the pivot points are in line with the end bearings of the associated rocking lever. The corresponding engine throttles will then be closed irrespective of whether the fluid pressure, responsive device has operated, since operation of the fluid pressure responsive device by the manner in which it moves pivot points in the linkage, causes steps in demanded percentage thrust, any percentage of zero demand being zero.

Referring now to FIGURES 3, 4 and 5, a fluid pressure responsive device for use in the group thrust compensator according to the invention comprises a housing 25 with a rear end plate 26 supporting a bearing cap 27 containing a bearing 28, and a front plate 29 containing a second bearing 30 the two bearings supporting a rotor shaft 31 which carries a rotor having a tubular portion 32 from which two radial vanes 33 project to the full diameter of the housing 25. The housing 25 is cylindrical internally except for two inwardly projecting walls 34, the inner ends of which come into closely spaced relation with the tubular portion 32 of the rotor. The edges of the tubular portion 32, the vanes 33 and the inner ends of the walls 34 are provided with grooves to form labyrinth seals. By the walls 34 and the vanes 33 the cylindrical housing 25 is divided into four chambers, respectively 35, 36, 37 and 38, which have equal volumes when the rotor is in the position shown in FIGURE 4. Rotation of the rotor anti-clockwise in FIG- URE 4 will increase the volumes of chambers 36 and 37 and, conversely, clockwise rotation of the rotor will reduce the volumes of chambers 35 and 38 while increasing the volumes of chambers 36 and 37. Two pipe connections, respectively 39 and 40, are provided at the lower left-hand region of the housing 25 and between these is an auto-selector valve, generally indicated by 41, having a ball 42 which may move to and fro in a suitably formed channel to engage the seats 43 or 44 at the extremities of its travel. From the valve 41 a duct 45 leads to the chamber 37. If fluid pressure is supplied to the two connections 39 and 40 through two independent pipes from the same pressure source, then the fluid will flow from both pipes past the valve 41, through the duct 45 and into the chamber 37. If one of the pipes should fail, so that heavy leakage occurs, then the fluid pressure from the remaining pipe will act to force the ball 42 against the seat 43 or 44 associated with the failed pipe, thereby shutting off this pipe while permitting fluid flow to continue from the remaining pipe through the duct 45 and into the chamber 37. In exactly similar manner, two pipe connections 46 and 47 with an intervening auto-selector valve 48 are provided to feed fluid under pressure through a duct 49 into the chamber 35; two fluid pressure connections 50 and 51 with an intervening auto-selector valve 52 are provided to feed fluid under pressure through a duct 53 into the chamber 36, and two fluid pressure connections 54 and 55 with an intervening auto-selector valve 56 are provided to feed fluid pressure through a duct 57 into the chamber 38. By this arrangement a redundant fluid feed system is accommodated.

The front plate 29 of the fluid pressure responsive device has mounted thereon two arms 58 and 59, pivoted respectively on pivots 60 and 61, with a spring 62 coupled between pins 63 and 64 on the respective arms, so that the two arms are drawn towards each other and into contact with the hub 65 and the roller 66. A disc-shaped part 67 having a hub 65 is attached and located by splines or keys on to the end of the rotor shaft 31 and is secured by means of a nut 68 and a tab washer 69. Projecting inwardly from the part 67 is a pin 70 carrying the roller 66, shown in section in FIGURE 3 and in chain dotted lines in FIGURE 5, which is in contact with flat faces 71 and 72 provided respectively on the arms 58 and 59. An actuating pin 73 is secured by suitable means to the outer face of the part 67 and the said part 67 has grooves formed around its outer cylindrical periphery to constitute a labyrinth seal with the inner diameter of the recessed part of the front plate 29. The operation of a fluid pressure responsive device in accordance with FIGURES 3, 4 and 5 when used with four lift thrust engines is described in detail in co-pending application No. 364,087. Each engine is provided with a source which produces a fluid pressure dependent on and proportional to the pressure in the respective jet pipes and therefore corresponding to the thrust output of the engine. This may consist of a pitot tube in the jet, or a static tapping, or it may consist of two identical venturis one having its inlet closed the difference in pressure in the two venturis being a measure of the thrust pressure in the jet. In operation the pressure in each of four engines may be applied through the auto-selector valves 41, 48, 52, 56 to the respective chambers 37, 35, 36, 38. In normal running the system is static with the pressures equal in each chamber and no turning moment is exerted on the rotor shaft. The arms 58 and 59 assisted by the spring 62 keep the roller 70 in central position. On failure of the engine connected to chamber 37 for example the pressure in that chamber will fall and the pressure in chamber 38 acting on the vane 33 will cause rotation of the rotor carrying with it the actuating pin 73 which is arranged to actuate linkage to open the throttles of the engines (see FIGURES 1 and 2).

Turning now to FIGURE 6 a rotary actuator 74 is illustrated in diagrammatic form divided into two chambers where the areas of the effective surfaces of the vanes are different. In this device it is possible to balance the pressure from a large engine against that of a smaller one by applying the pressure from the larger engine to the chamber 76 against the smaller effective vane area and that from the smaller engine to the chamber 75 against the larger vane area. If the large engine's performance deteriorates, a hub 151 is rotated by the vanes to move an actuated pivot 20 (see FIGURE 1) by means of arm 152.

In the arrangement shown in FIGURES 1 and 2 it will be seen that the inboard engine 5 is larger than the engines 1, 2, 3 and 4. It will therefore be convenient to construct the rotary actuator 13 associated with the engine 5 in accordance with FIGURE 6 and to connect engine 5 to the chamber 76 to balance the pressure from engine 5 against the pressure of one of the engines 1, 2, 3 or 4 in the chamber 75. The engines 1, 2, 3 and 4 of the group are connected to rotary actuator 14 which may conveniently be constructed according to FIGURES 3, 4 and 5, these four engines are connected individually to the four chambers of actuator 14. Instead of rotary actuators double acting cylinder and piston devices may be used such as that shown in FIGURE 7.

Referring to FIGURE 7, a fluid pressure responsive device 251 according to the invention comprises a casing 77 which contains four cylinders, respectively 78, 79, 80 and 81. Each cylinder contains a piston, respectively 82, 83, 84 and 85. The piston 82 is provided with a piston rod or ram 86 which passes through the one end 87 of the cylinder 78, and in a similar manner the piston 83 has a piston rod 88 passing through the end 89 of the cylinder 79, the piston 84 has a piston rod, 90 passing through an end 91 of the cylinder 80 and the piston 85 has a piston rod 92 passing through the end 93 of the cylinder 81. The other ends of the cylinders 78, 79, 80 and 81 are open to a chamber 94 formed by one end of the casing 77. Stops 95 are provided to prevent the pistons 82, 83, 84 and 85 moving out of their respective cylinders under the influence of fluid pressure and of a spring 96, supported by an abutment 97, which acts upon all the piston rods through the medium of a common member 98.

The fluid pressure from the source associated with one lift engine is transmitted to the group thrust compensator through a pipe 99, the pressure from the source associated with a second lift engine is transmitted to the group thrust compensator through a pipe 100, and the pressure from the source associated with a third lift engine is transmitted to the group thrust compensator through a pipe 101. A similar source of fluid pressure is provided for a fourth lift thrust engine and the pressure is transmitted by a pipe 102 to the group thrust compensator.

The three pipes 99, 100 and 101 are shown connected respectively to the closed ends of the cylinders 78, 79 and 80. The pipe 99 is provided with a branch 103 which is connected through a metering orifice 104 to the common chamber 94 and in similar fashion the pipe 100 is provided with a branch 105 connected through a metering orifice 106 to the chamber 94 and the pipe 101 is provided with a branch 107 connected through a metering orifice 108 to the chamber 94. The chamber 94 is also provided with a leak device 109 through which fluid under pressure in the chamber 94 may leak at a controlled rate into an exhaust pipe 110.

The three cylinders 78, 79 and 80 are of identical diameter but it will be observed that the cylinder 81 is of smaller diameter and is longer, so that the piston 85 may have a longer stroke. The pipe 102 from a combined lift/thrust engine is connected to this cylinder but there is no branch from the pipe 102 connected to the chamber 94.

The common member 98 shown in FIGURE 7 is mechanically connected to a rod 111 which operates the throttle control run (see FIGURE 10) and is mechanically connected to the engines by means of linkage which is also connected to the pilot's manual throttle control. In operation and assuming that all the engines (in this instance four) are running normally a fluid pressure corresponding to the output of three of the engines is applied respectively to the cylinders 78, 79, 80 while a pressure corresponding to the output of the fourth engine is applied to the cylinder 81. By virtue of the metering orifices 104, 106, 108 the pressure in the chamber 94 is equal to the mean of three pressures in the pipes 99, 100, 101.

It will be apparent that the pressure in the chamber 94 acts upon the outer face of the piston and this pressure is as mentioned the mean of the pressure existing in the jets. The other face of the piston is acted upon only by the jet pressure in the associated engine and because of the presence of the piston rod or ram this face has a smaller effective area so that in normal conditions the piston would move to the right in the figure. However such movement is resisted by the spring 96 which applies such force as to make up for the difference in the forces acting on the two sides of the pistons 86, 88, 90. If one of the engines associated with the cylinders 78, 79, 80 should fail the pressure acting on the inner face of the associated piston will fail and the forces on the pistons will become unbalanced and they will all move to the right compressing the spring 96 until a new balanced position is reached. This movement of the common member 98 causes equal movement of the rod 111 which movement is arranged (see FIGURE 10) to open the throttles of all the engines so as to restore the total thrust of the engines to its original level.

It will be observed that while the fourth engine communicates a pressure to its cylinder 81 corresponding to its jet pipe pressure it can have no effect on the pressure in the chamber 94 but the pressure in the cylinder 81 does add to the total force acting to assist the spring 96 so that a loss of thrust in this engine will also cause the throttles of all the engines to be opened. Due to the fact that the cylinder 81 has a smaller cross sectional area a given loss in jet pressure will have less effect than the same loss of pressure in the three lift engines associated with cylinders 78, 79 and 80. However this is what is required since a part of the output of the fourth engine is, in the instance described, used for providing a forward thrust and only a part is used for lifting.

The construction illustrated guards against an upward engine failure (i.e. of an engine running away) in that the pressure in chamber 94 is related to the means tapped engine pressure by the use of the metering orifices 104, 106, 108. Consequently the group thrust compensator will not operate in these circumstances owing to the fact that the difference between the mean tapped engine pressure and the maximum possible pressure from the runaway engine (i.e. that when the engine overspeed governor operates) will not be as great as the designed insensitivity of the group thrust compensator. The sensing criteria of the device are so chosen that response on downward engine failure is not affected.

Referring to FIGURE 8 output pin 73 of the fluid pressure responsive device is pivotally mounted in a plate 201 which rotates about a pin 202 in response to movements of the pin 73. Two arms 203 and 204 are pivotally mounted at one end to pin 202 and at their other ends by way of pivots 205 and 206 to links 207 and 208 respectively. Links 207 and 208 are both connected to a free pivot 209 of a crank 210 the fixed pivot 211 of which forms the normal pivot of a control arm 212. The control arm 212 has two notches 213 and 214 the first of which 213 normally engages the normal pivot 211 and the second of which 214 engages free pivot 209 when the crank 210 is rotated as a result of motion of pin 73. The one end 215 of control arm 212 is connected by way of throttle link 216 to the throttles 217, 218, 219 and 220 of engines 221, 222, 223 and 224. These engines are the engines forming a group, the group thrust compensation of which is required and which have pressure signals representing thrust connected to the fluid pressure responsive device.

The other end 225 of control arm 212 is connected by way of a linkage 226 to a manual throttle control 227 which pivots about pivot 228. The plate 201 has two members 229 and 230 rigidly attached thereto and arranged so that one of the members 229 or 230 will engage a pivot point 205 or 206 when the plate 201 is rotated by pin 73. The linkage 203, 204, 207 and 208 ensures that the crank 210 rotates clockwise independently of the direction of rotation of the plate 201 when the plate 201 is rotated from the position shown.

Reduction of thrust of one of the engines 221, 222, 223 and 224 causes the fluid pressure responsive device to move pin 73 which in turn rotates plate 201. Plate 201 moves linkage 203, 204, 207 and 208 to bring free pivot 209 into engagement with notch 214 and this notch 214 becomes the pivot point, for manual throttle movement, of the control arm 212 resulting in magnification of manual throttle control movement to engine throttle movement. The free pivot 209 moves the arm 212 about end 225 to open the throttles of the engines to compensate for the loss of thrust detected by the fluid pressure responsive device.

Referring to FIGURE 9, when the device 251 operates, rod 111 advances a pin 252 along a line 253 to the operated position 254 shown dotted. A lever 255, coupled at one end via link 256 to the engine throttle control levers 257, 258, 259 and 260 of respectively three small engines 261, 262, 263 and one large engine 264 forming a group, has two notches 265 and 266. In normal operation, the lever 255 pivots at notch 265 about a fixed pin 267 whenever a manual throttle control 269 is operated to move the other end 268 of lever 255. If the manual throttle control and consequently the lever 255 are in a normal position within the normal operating range of throttle settings, when the performance of one of the engines deteriorates or fails thereby causing device 251 to operate, the resulting movement of pin 252 from the position shown to position 254 causes the pin 252 to engage notch 266 in lever 255 and swings the lever about its other end 268 anticlockwise to open all the engine throttles. In this condition, movements of the manual throttle control 269 results in the lever 255 pivoting about notch 266 instead of its normal notch 265 thereby causing a magnification of manual throttle control movement to engine throttle movement to compensate for the engine failure.

It will be understood that embodiments other than those described and illustrated or modifications thereof, may be devised within the scope of the invention as defined in the appended claims.

What is claimed is:

1. A group thrust compensator comprising first means for automatically varying the engine throttle openings of a group of jet engines in response to disturbance of lift thrust caused by deterioration of operation of at least one engine, a manual throttle control and second means operated by said first means to provide magnification of a manual throttle displacement signal to at least one unaffected engine to compensate for deterioration of operation of another engine.

2. A group thrust compensator for correcting distrubance of the lift thrust of a group of jet engines caused by the deterioration of operation of at least one engine, comprising a manual throttle control, at least one fluid pressure responsive device, at least one movable member in said device, means for balancing fluid pressure derived from such engine corresponding to the lift thrust thereof when in operation against fluid pressure derived from a different engine so that upon unbalance in said pressures occurring movement of said movable member takes place, means associated with said movable member arranged so that a reduction in the fluid pressure derived from one engine causes the engine throttle openings to be altered and means providing magnification of a manual throttle displacement signal to at least one unaffected engine to compensate for deterioration of operation of an affected engine.

3. A group thrust compensator for correcting disturbance of the lift thrust of a group of jet engines caused by deterioration in operation of at least one engine, comprising at least one fluid pressure responsive device, at least one rotary movable member in said device, means for balancing fluid pressure derived from each engine corresponding to the lift thrust thereof when in operation against the fluid pressure derived from a different engine whereby upon unbalance in said pressures occurring rotation of said movable member takes place, an actuating member on said movable member, a manual throttle control, and linkage including a rocking lever pivotally associated normally with the pivot axis of said rotary member and movable upon rotation of said movable member for engagement with said actuating member on an axis nearer the input from the manual throttle control, whereby operation of the fluid pressure responsive device is effective to magnify the throttle control signal.

4. A group thrust compensator according to claim 3 wherein said rocking lever is provided with indentations for respectively engaging pivot pins disposed on said respective axes.

5. A group thrust compensator for correcting disturbance of the lift thrust of a group of jet engines caused by deterioration in operation of at least one engine, comprising at least one fluid pressure responsive device, at least one rotary movable member in said device, means for balancing fluid pressure derived from each engine corresponding to the lift thrust thereof when in operation against the fluid pressure derived from a different engine whereby upon unbalance in said pressures occurring rotation of said movable member takes place, an actuating member on said movable member, a manual throttle control, linkage including rocking levers normally associated with a fixed pivot connected by linkage with the pivot point of said rotary member and associated with said actuating member whereby operation of the fluid pressure responsive device results in replacement of the normal fixed pivot point of said rocking levers by a pivot point nearer to the input from the manual throttle control thereby magnifying the throttle control signal.

6. A group thrust compensator in accordance with claim 2 in which said fluid pressure responsive device comprises double acting piston and cylinder means.

7. A group thrust compensator according to claim 1 wherein said first means includes connections for the pressure from each engine to one end of a piston and cylinder device and to a common chamber, said common chamber being in connection with the other end of each cylinder and piston device, resilient means acting on the pistons against the pressure from the common chamber whereby all the pistons are acted upon at the one side by the mean pressure derived from the plurality of sources, each piston is acted upon at its other side by a pressure derived from the source of the associated engine and the movements of all the pistons are transmitted to the throttle control.

8. A group thrust compensator according to claim 10 for a group of jet engines generating a lift thrust, comprising a double-acting fluid cylinder and a piston and piston rod contained therein for each engine of the group, a source of fluid pressure for each engine to provide a fluid pressure corresponding to the thrust delivered by the engine when in operation, means to apply the fluid pressure from each source to the end of the respective cylinder containing the piston rod, a connection from the source of fluid pressure on each engine to a common chamber through a metering orifice, a connection from the common chamber to the other end of each cylinder, a calibrated leak device to allow fluid in the common chamber to escape at a controlled rate, mechanical connections from the piston rods of all the cylinders to a single engine throttle control controlling the throttles of all the engines in the group, and resilient means acting on the pistons against the pressure from the common chamber, whereby all the pistons are acted upon at the one side by the mean pressure derived from the plurality of sources, each piston is acted upon at its other side by a pressure derived from the source on the associated engine and the movements of all the pistons are transmitted to the throttle control.

9. A group thrust compensator for correcting disturbance of the lift thrust of a group of jet engines caused by the deterioration of operation of one or more engines according to claim 7 including means in said fluid pressure responsive device whereby in the event of an engine running away said group thrust compensator does not operate.

10. A group thrust compensator according to claim 9 in which said last mentioned means includes metering orifices through which each engine is connected to the common chamber of said fluid pressure responsive device.

References Cited by the Examiner
UNITED STATES PATENTS 3,161,382 12/1964 Pfaff _____ 60—39.15 X
3,234,740 2/1966 Moore _____ 60—39.15 X MARK NEWMAN, *Primary Examiner.*

D. HART, *Assistant Examiner.*